(12) United States Patent
Tung et al.

(10) Patent No.: US 7,459,082 B2
(45) Date of Patent: Dec. 2, 2008

(54) FEED SPACER FOR SPIRAL-WOUND MEMBRANE MODULE

(75) Inventors: Kuo-Lun Tung, Jhongli (TW); Yu-Ling Li, Jhongli (TW); Ming-Yang Lu, Taoyuan County (TW); Juin-Yih Lai, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 0 days.

(21) Appl. No.: 11/235,114

(22) Filed: Sep. 27, 2005

(65) Prior Publication Data

US 2006/0169631 A1   Aug. 3, 2006

(30) Foreign Application Priority Data

Jan. 28, 2005   (TW) ................ 94102822 A

(51) Int. Cl.
    *B01D 63/10*   (2006.01)
(52) U.S. Cl. ............... 210/321.83; 210/321.74; 210/321.76; 210/321.85; 210/456; 210/493.4
(58) Field of Classification Search ........... 210/321.74, 210/321.76, 321.83, 321.85, 456, 493.4
    See application file for complete search history.

(56) References Cited

U.S. PATENT DOCUMENTS 4,861,487 A * 8/1989 Fulk, Jr. .................... 210/644
4,902,417 A * 2/1990 Lien ...................... 210/321.74
5,275,726 A * 1/1994 Feimer et al. ........... 210/321.74
6,068,771 A * 5/2000 McDermott et al. ..... 210/321.83
6,881,336 B2 * 4/2005 Johnson ................. 210/321.76
6,989,097 B2 * 1/2006 Karode et al. ............ 210/493.4
2003/0146090 A1 * 8/2003 Mack et al. ................. 204/269

OTHER PUBLICATIONS

Journal of Membrane Science, 62 (1991), pp. 275-291.*
Journal of Membrane Science, 82 (1994), pp. 79-98.*

* cited by examiner

*Primary Examiner*—John Kim
(74) *Attorney, Agent, or Firm*—WPAT., P.C.; Justin King

(57) ABSTRACT

The present invention discloses a feed spacer, comprising a first layer and a second layer, for spiral-wound membrane module. The first layer consists of a plurality of first filaments, which are substantially in parallel to one another. Furthermore, the second layer also consists of a plurality of second filaments, which are substantially in parallel to one another. Moreover, the first layer is attached to the second layer, and the first filaments are disposed at an angle to the second filaments. Both the first layer and the second layer bend to the center of the spiral-wound. Additionally, the distance from the inside of the first layer to the center is bigger than that from the inside of the second layer to the center, and the diameter of the first filament is smaller than that of the second filament.

7 Claims, 5 Drawing Sheets

FEED SPACER FOR SPIRAL-WOUND MEMBRANE MODULE

BACKGROUND OF THE INVENTION

1. Field of the Invention

The present invention is generally related to a spacer, and more particularly to a feed spacer for spiral-wound membrane module.

2. Description of the Prior Art

Membrane filtration procedures are well applied in industries. Therefore, various filtration membrane apparatus are designed and manufactured. For example, spiral wound membrane module is used in cross-flow filtration, and the advantages of spiral wound membrane module are smaller size, greater filtration area, and higher shear rate. A cross-sectional view of a conventional spiral wound membrane module is shown in FIG. 1, wherein the spiral wound membrane module comprises an outer cover 110, feed spacer 120, permeate spacer 130 and permeate collection tube. Besides, arrows 150 indicate the flow direction of permeate. The filtration membranes are in planar contact with the outer surface and the inner surface of the feed spacer. Furthermore, the feed spacer serves both as mechanical stabilizer for channel geometry and turbulence promoters for reducing polarization phenomena near the membrane surface.

The conventional spacer has a plurality of rows of elongated filaments, for example two rows. The filaments of a same row are substantially parallel to each other. The rows are disposed in layers where the filaments of one row are attached to, typically by fusion, and generally crossing the filaments of adjacent rows at an angle. However, no any effort has been placed on the effects of curvature of the spacer and membrane permeability in the spiral-wound modules on the pressure drop, shear rate and separation efficiency through the curved module. In conventional system, the curved spacer in a spiral wound module causes unequal shear rate at inner and outer membrane surfaces. Such unequal shear rates at the inner and outer surfaces would be expected to have an adverse impact on the membrane module performance because of different fouling characteristics for adjacent membrane leaves. Therefore, there is still a need to develop new feed spacer for spiral-wound membrane module, so as to balance the shear rate of inner and outer surfaces of the feed spacer, and then to prolong the service life of spiral-wound membrane module.

SUMMARY OF THE INVENTION

In accordance with the present invention, a new feed spacer for spiral-wound membrane module is provided that substantially overcomes the drawbacks of the above problems mentioned from the conventional system.

One object of this invention is to adjust the feed spacer diameter ratio of outer to inner filaments, so as to reduce the shear rate difference between outer and inner surfaces of feed spacer. Results showed that decreasing of the diameter of outer filament can improve the mentioned adverse impact. Another object of this invention is to arrange feed spacer with different filament diameter inside the spiral-wound membrane module, and arrange feed spacer with the same filament diameter outside the spiral wound membrane module, whereupon the shear rate difference between outer and inner surfaces of feed spacer can be controlled according to the relative distance between the feed spacer and the center of the spiral-wound membrane module. Therefore, this present invention does have the economic advantages for industrial applications.

Accordingly, the present invention discloses a feed spacer, comprising a first layer and a second layer, for spiral-wound membrane module. The first layer consists of a plurality of first filaments, which are substantially in parallel to one another. Furthermore, the second layer also consists of a plurality of second filaments, which are substantially in parallel to one another. Moreover, the first layer is attached to the second layer, and the first filaments are disposed at an angle to the second filaments. Both the first layer and the second layer bend to the center of the spiral-wound. Additionally, the distance from the inside of the first layer to the center is bigger than that from the inside of the second layer to the center, and the diameter of the first filament is smaller than that of the second filament.

DESCRIPTION OF THE PREFERRED EMBODIMENTS

What is probed into the invention is a feed spacer for spiral-wound membrane module. Detailed descriptions of the production, structure and elements will be provided in the following in order to make the invention thoroughly understood. Obviously, the application of the invention is not confined to specific details familiar to those who are skilled in the art. On the other hand, the common elements and procedures that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
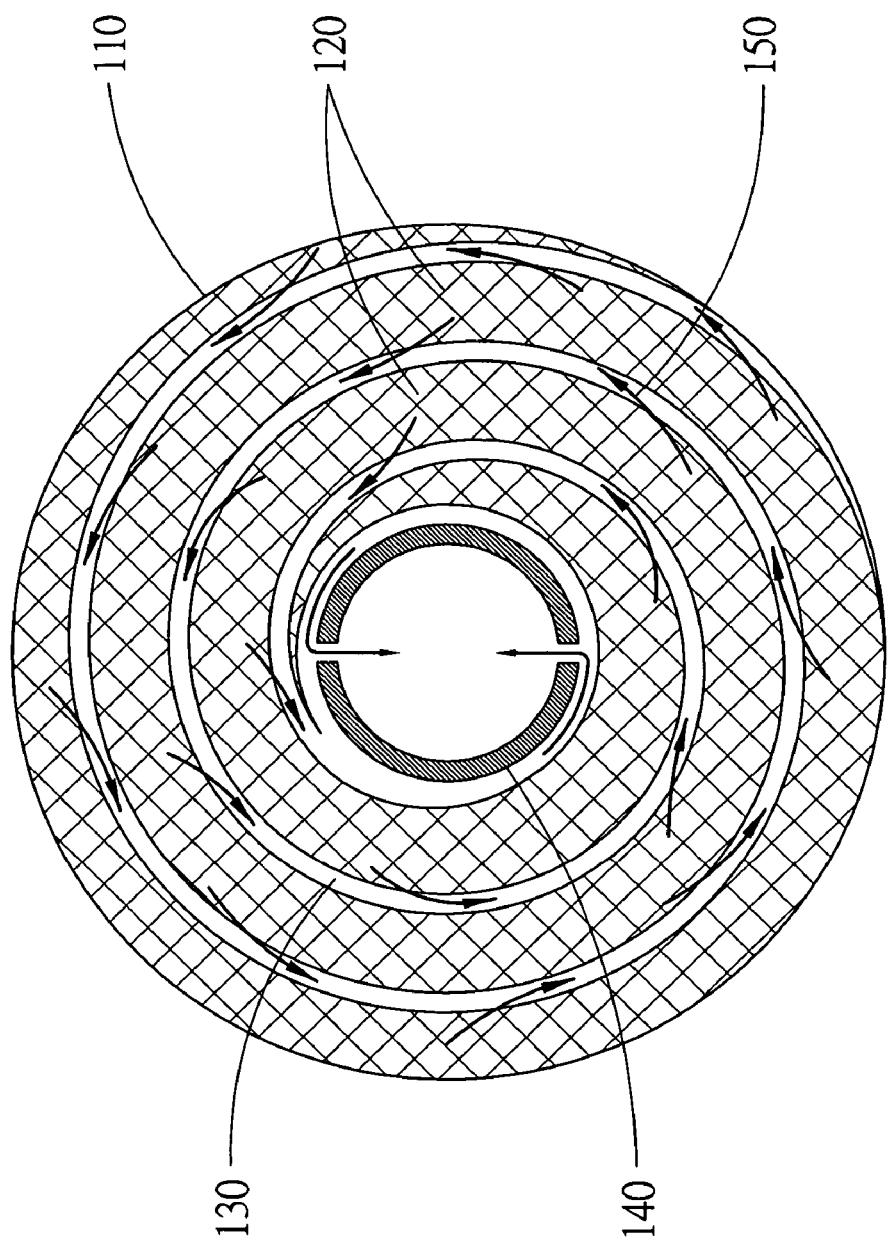
FIG. 1 is a cross-sectional view of a spiral wound membrane module according to prior art.
Figure 2A:
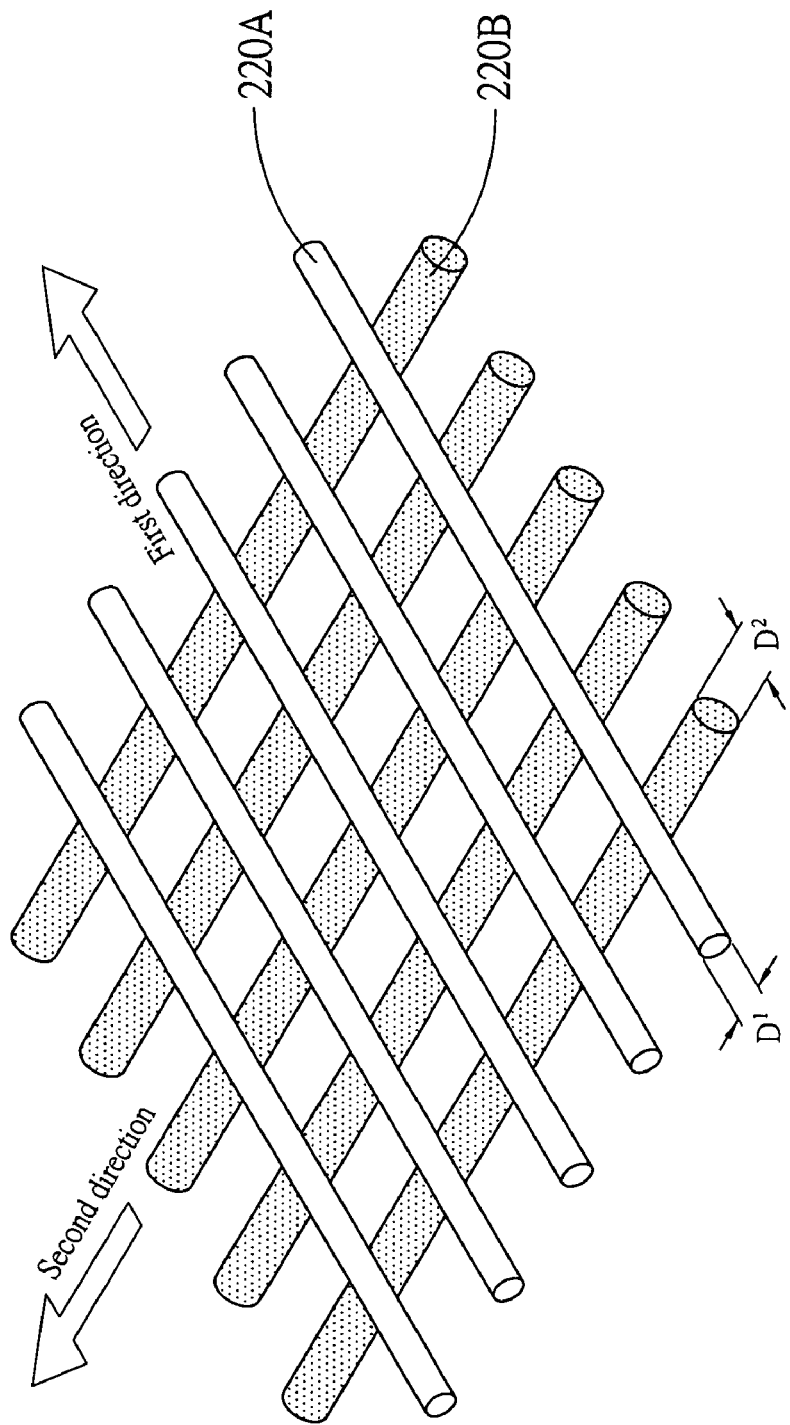
FIG. 2A is a schematic diagram of a feed spacer for spiral-wound membrane module, in accordance with the first embodiment of the present invention.
Figure 2B:
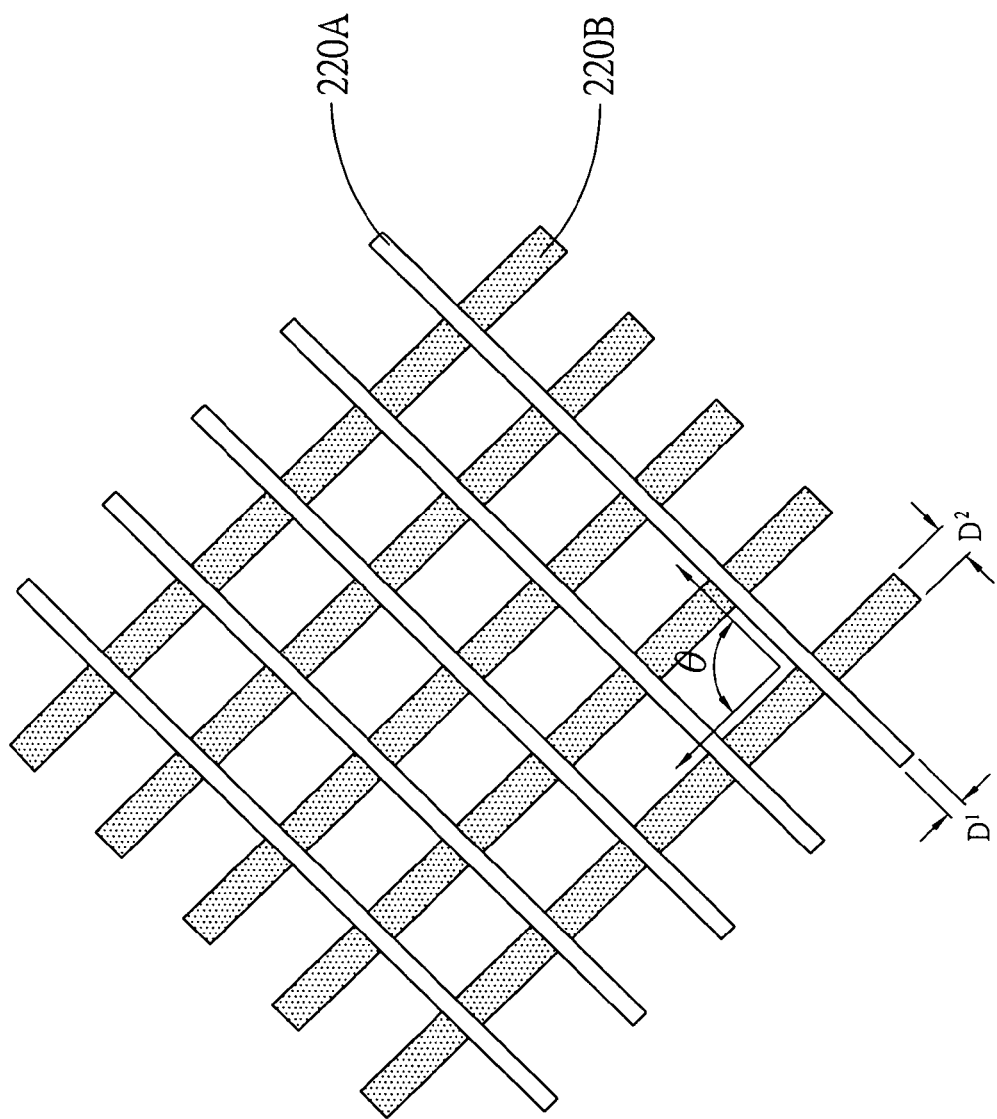
FIG. 2B is a top view of FIG. 2A.
Figure 2C:
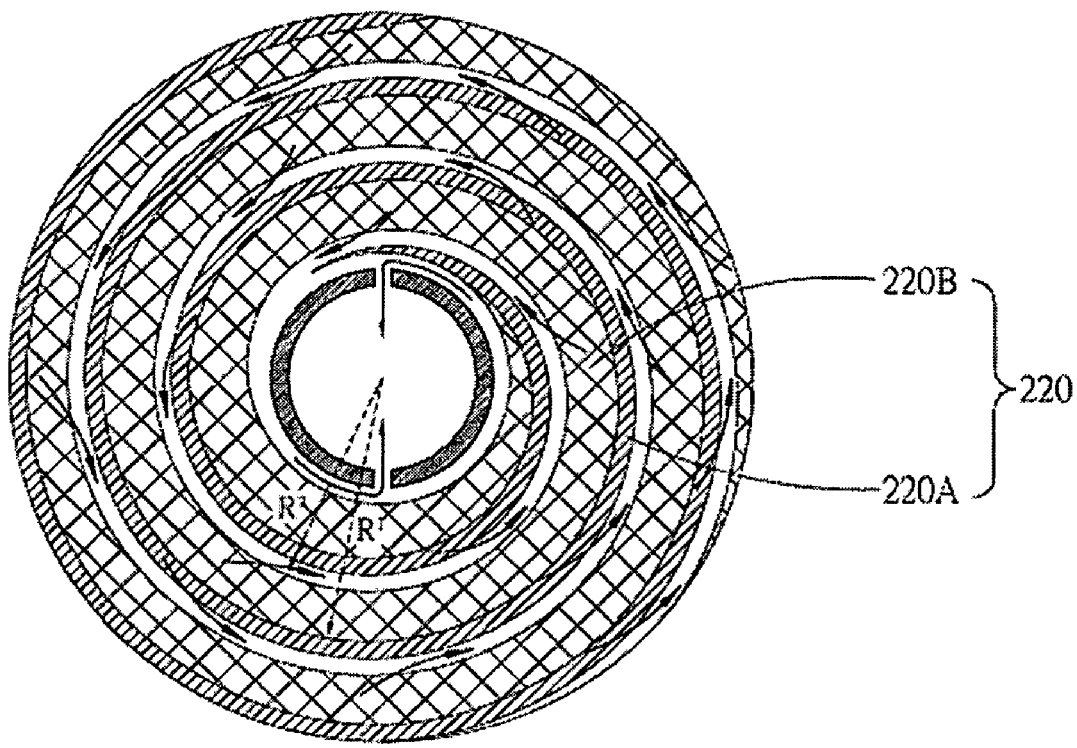
FIG. 2C is a cross-sectional view of a feed spacer for spiral-wound membrane module, in accordance with the first embodiment of the present invention.

Referring to FIG. 2A, in a first embodiment of the present invention, a feed spacer 220 for spiral-wound membrane module is disclosed, wherein the feed spacer 220 comprises a first layer 220A and a second layer 220B. The mentioned first layer 220A consists of a plurality of first filaments with first diameter $D^1$, wherein the first filaments are substantially in parallel to one another, and are arranged along a first direction. The mentioned second layer 220B consists of a plurality of second filaments with second diameter $D^2$, wherein the second filaments are substantially in parallel to one another, and are arranged along a second direction. Furthermore, a top view of FIG. 2A is shown in FIG. 2B, wherein the first layer 220A is attached to the second layer 220B, the angle between the first direction and the second direction ranges from 60° to 120°, and the preferred angle is 80°. Additionally, referring to FIG. 2C, both the first layer 220A and the second layer 220B bend to the center of the spiral-wound, wherein $R^1$ is defined as the distance from the inside of the first layer 220A to the center of the spiral-wound, $R^2$ is defined as the distance from the inside of the second layer 220B to the center of the spiral-wound, and $R^1$ is bigger than $R^2$, $D^1$ is smaller than $D^2$. Besides, the ratio of $D^1$ to $D^2$ ranges from 0.7 to 1, and the preferred ratio ranges from 0.75 to 0.85.

Figure 3:
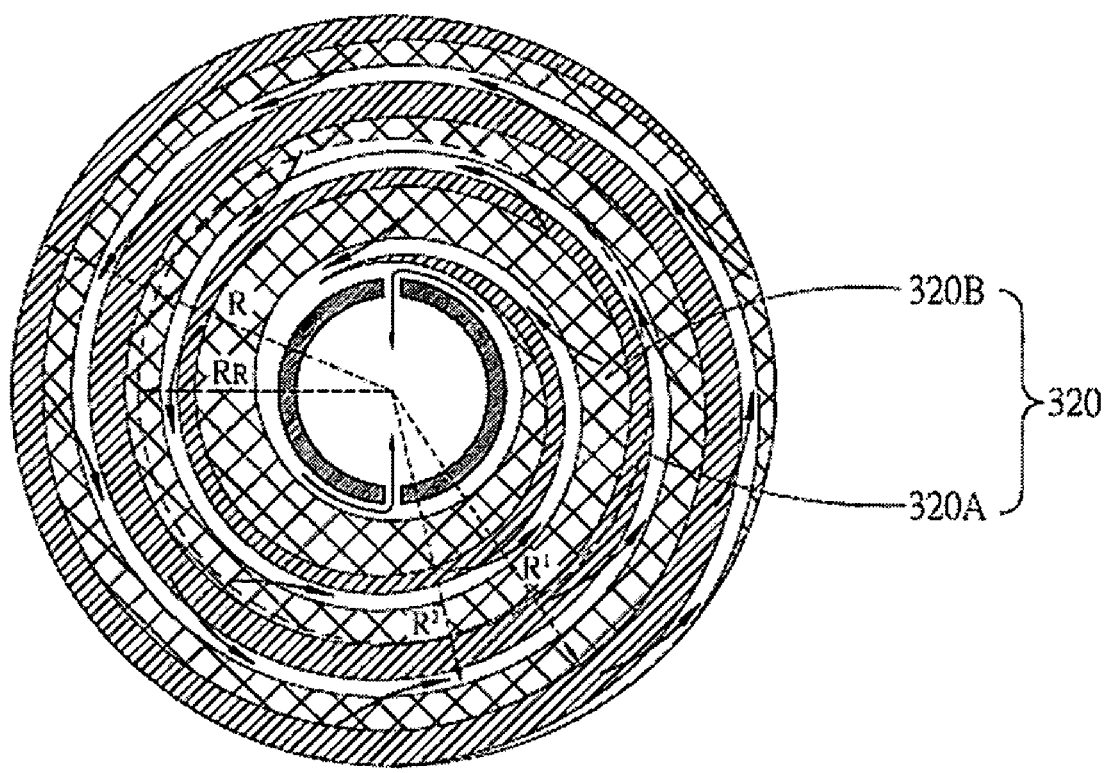
FIG. 3 is a cross-sectional view of a feed spacer for spiral-wound membrane module, in accordance with the second embodiment of the present invention.

Referring to FIG. 3, in a second embodiment of the present invention, a feed spacer 320 for spiral wound is disclosed, wherein the feed spacer 320 comprises a first layer 320A and a second layer 320B. The mentioned first layer 320A consists of a plurality of first filaments with first diameter $D^1$, wherein said plurality of first filaments are substantially in parallel to one another, and are arranged along a first direction. The mentioned second layer, consisting of a plurality of second filaments with second diameter $D^2$, wherein said plurality of second filaments are substantially in parallel to one another, and are arranged along a second direction. Furthermore, the first layer 320A is attached to the second layer 320B, the angle between the first direction and the second direction ranges from 60° to 120°, and the preferred angle is 80°. Both the first layer 320A and the second layer 320B bend to the center of the spiral-wound. Additionally, R is defined as the diameter of the spiral-wound membrane module, $R^1$ is defined as the distance from the inside of the first layer 320A to the center of the spiral-wound, $R^2$ is defined as the distance from the inside of the second layer 320B to the center of the spiral-wound, and $R_R$ is defined as a ratio of $R^2$ to R, wherein $R^1$ is bigger than $R^2$, $0 < R_R < 1$. When $R_R$ is equal to or bigger than a specific value, $D^1$ is equal to $D^2$; when $R_R$ is smaller than said specific value, $D^1$ is smaller than $D^2$. Besides, the ratio of $D^1$ to $D^2$ ranges from 0.7 to 1, and the preferred ratio of $D^1$ to $D^2$ ranges from 0.75 to 0.85.

In the above preferred embodiments, the present invention can adjust the feed spacer diameter ratio of outer to inner filaments, so as to reduce the shear rate difference between outer and inner surfaces of feed spacer. Results showed that decreasing of the diameter of outer filament can improve the mentioned adverse impact. Another object of this invention is to arrange feed spacer with different filament diameter inside the spiral-wound membrane module, and arrange feed spacer with the same filament diameter outside the spiral wound membrane module, whereupon the shear rate difference between outer and inner surfaces of feed spacer can be controlled according to the relative distance from the feed spacer to the center of the spiral-wound membrane module. Therefore, this present invention does have the economic advantages for industrial applications.

To sum up, the present invention discloses a feed spacer, comprising a first layer and a second layer, for spiral-wound membrane module. The first layer consists of a plurality of first filaments, which are substantially in parallel to one another. Furthermore, the second layer also consists of a plurality of second filaments, which are substantially in parallel to one another. Moreover, the first layer is attached to the second layer, and the first filaments are disposed at an angle to the second filaments. Both the first layer and the second layer bend to the center of the spiral-wound. Additionally, the distance from the inside of the first layer to the center is bigger than that from the inside of the second layer to the center, and the diameter of the first filament is smaller than that of the second filament.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A feed spacer for spiral-wound membrane module, comprising:

a first layer, consisting of a plurality of first filaments with first diameter $D^1$, wherein said plurality of first filaments are substantially in parallel to one another, and are arranged along a first direction; and a second layer, consisting of a plurality of second filaments with second diameter $D^2$, wherein said plurality of second filaments are substantially in parallel to one another, and are arranged along a second direction; said first layer is attached to said second layer, and both said first layer and said second layer bend to the center of the spiral-wound membrane module;

$R^1$ is defined as the distance from the inside of said first layer to the center of the spiral-wound membrane module, $R^2$ is defined as the distance from the inside of said second layer to the center of the spiral-wound membrane module; $R^1$ is bigger than $R^2$, such that said first layer it an outer layer and said second layer is an inner layer, wherein said first layer is in planar contact with an outer filtration membrane and said second layer is in planar contact with an inner filtration membrane;

$D^1$ is smaller than $D^2$, and the ratio of $D^1$ to $D^2$ ranges from 0.79 to 0.85, so as to balance the shear rate on said inner and outer filtration membranes, and then to prolong the service life of the spiral-wound membrane module.

2. The feed spacer according to claim 1, wherein the angle between said first direction and said second direction ranges from 60° to 120°.

3. The feed spacer according to claim 1, wherein the preferred angle between said first direction and said second direction is 80°.

4. A feed spacer for spiral-wound membrane module, comprising:

a first layer, consisting of a plurality of first filaments with first diameter $D^1$, wherein said plurality of first filaments are substantially in parallel to one another, and are arranged along a first direction; and a second layer, consisting of a plurality of second filaments with second diameter $D^2$, wherein said plurality of second filaments are substantially in parallel to one another, and are arranged along a second direction; said first layer is attached to said second layer, and both said first layer and said second layer bend to the center of the spiral-wound membrane module;

R is defined as the diameter of the spiral-wound membrane module, $R^1$ is defined as the distance from the inside of said first layer to the center of the spiral-wound membrane module, $R^2$ is defined as the distance from the inside of said second layer to the center of the spiral-wound membrane module, $R_R$ is defined as a ratio of $R^2$ to R, $0 < R_R < 1$, $R^1$ is bigger than $R^2$, such that said first layer is an outer layer and said second layer is an inner layer, wherein said first layer is in planar contact with an outer filtration membrane and said second layer is in planar contact with an inner filtration membrane;

when RR is equal to or bigger than a specific value, $D^1$ is equal to $D^2$ when $R_R$ is smaller than said specific value, $D^1$ is smaller than $D^2$, the preferred-ratio of $D^1$ to $D^2$ ranges from 0.79 to 0.85, so as to balance the shear rate on said inner and outer filtration membranes, and Then to prolong the service life of the spiral-wound membrane module.

5. The feed spacer according to claim 4, wherein said specific value increases with increasing velocity of feed.

6. The feed spacer according to claim 4, wherein the angle between said first direction and said second direction ranges from 60° to 120°.

7. The feed spacer according to claim 4, wherein the preferred angle between said first direction and said second direction is 80°.

* * * * *